(12) United States Patent
Khalid

(10) Patent No.: US 10,504,171 B2
(45) Date of Patent: Dec. 10, 2019

(54) NEAR-FIELD COMMUNICATION (NFC)-BASED RETAIL EXPERIENCE USING A RETAIL KIOSK OR MOBILE DEVICE

(71) Applicant: Cellco Partnership, Basking Ridge, NJ (US)

(72) Inventor: Mohammad Raheel Khalid, Budd Lake, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 394 days.

(21) Appl. No.: 15/426,257

(22) Filed: Feb. 7, 2017

(65) Prior Publication Data

US 2017/0148080 A1    May 25, 2017

Related U.S. Application Data

(62) Division of application No. 13/873,025, filed on Apr. 29, 2013, now Pat. No. 9,595,058.

(51) Int. Cl.
*G06Q 30/00* (2012.01)
*G06Q 30/06* (2012.01)
(Continued)

(52) U.S. Cl.
CPC ..... *G06Q 30/0629* (2013.01); *G06K 7/10861* (2013.01); *G06Q 30/0226* (2013.01); *G06Q 30/0238* (2013.01); *G06Q 30/0268* (2013.01); *G06Q 30/0623* (2013.01); *G06Q 30/0625* (2013.01); *G06Q 30/0631* (2013.01);
(Continued)

(58) Field of Classification Search
CPC ..... G06Q 30/06; G06Q 30/0601–0643; G06Q 30/08; G06Q 30/0238; G06Q 30/0226; G06Q 30/0268; H04W 12/06; H04W 4/70; H04W 4/80; H04B 5/0056; H04B 5/0062; G07G 1/00; G07G 1/0036; G07G 1/01; G06K 19/00; G06K 19/06009;
(Continued)

(56) References Cited

U.S. PATENT DOCUMENTS

2001/0044743 A1    11/2001    McKinley et al.
2002/0130178 A1    9/2002     Wan et al.
(Continued)

OTHER PUBLICATIONS

Orr, "Gen Y and Self-Service: A Love Story", May 22, 2012, by Sheridan Orr. [obtained from www.retailcustomerexperience.com].

*Primary Examiner* — William J Allen

(57) ABSTRACT

A customer is provided with a personalized retail experience using a retail kiosk or mobile device that is enabled for near-field communication (NFC). The kiosk is provided with customer identifying information through an NFC-based communication with a customer's user device. The kiosk authenticates the customer based on the identifying information, retrieves retail information associated with the customer from a back-end server, and provides the personalized retail experience using the retrieved information. In one example, the personalized retail experience is provided based on customer-input received through an NFC reader of the kiosk. Also, the mobile device can be provided with a retail store identifier through an NFC-based communication link with an NFC tag for the store. The personalized retail experience can then be provided through the mobile device based on retail information for the retail store that is retrieved by the mobile device based on the identifier obtained through NFC.

18 Claims, 5 Drawing Sheets

(51) Int. Cl.
    *G06Q 30/02*     (2012.01)
    *H04B 5/00*      (2006.01)
    *H04W 4/70*      (2018.01)
    *H04W 4/80*      (2018.01)
    *G06K 7/10*      (2006.01)
    *H04W 12/06*     (2009.01)

(52) U.S. Cl.
    CPC ....... *G06Q 30/0641* (2013.01); *H04B 5/0025* (2013.01); *H04B 5/0056* (2013.01); *H04B 5/0062* (2013.01); *H04W 4/70* (2018.02); *H04W 4/80* (2018.02); *H04W 12/06* (2013.01)

(58) Field of Classification Search
    CPC ....... G06K 19/06187; G06K 19/06215; G06K 19/067; G06K 19/07–0722
    See application file for complete search history.

(56) References Cited

U.S. PATENT DOCUMENTS

| | | |
|---|---|---|
| 2008/0262928 A1 | 10/2008 | Michaelis |
| 2011/0125601 A1 | 5/2011 | Carpenter et al. |
| 2012/0173351 A1 | 7/2012 | Hanson et al. |
| 2012/0284012 A1 | 11/2012 | Rodriguez et al. |
| 2013/0041950 A1 | 2/2013 | Chan |
| 2013/0173433 A1 | 7/2013 | Moghadam et al. |
| 2013/0325620 A1 | 12/2013 | Walker |
| 2013/0339113 A1 | 12/2013 | Junger |
| 2014/0236770 A1 | 8/2014 | Acosta et al. |
| 2014/0351071 A1 | 11/2014 | Hong et al. | ns
NEAR-FIELD COMMUNICATION (NFC)-BASED RETAIL EXPERIENCE USING A RETAIL KIOSK OR MOBILE DEVICE

CROSS-REFERENCES TO RELATED APPLICATIONS

This application is a divisional of U.S. application Ser. No. 13/873,025, entitled "NEAR-FIELD COMMUNICATION (NFC)-BASED RETAIL EXPERIENCE USING A RETAIL KIOSK OR MOBILE DEVICE", filed on Apr. 29, 2013, the entirety of which is incorporated by reference herein.

BACKGROUND

In recent years, the variety of mobile communication devices, subscription plans, and other services available to customers have expanded. Many mobile wireless network operators offer mobile devices including smartphones and basic mobile phones, tablets, hotspots, and mobile modems, each of which may offer different features, performance, or connectivity than competing devices. The operators further offer subscription plans and prepaid service plans for communication services, including plans offering wireless mobile communication service for voice calls, mobile messaging services (e.g., text and/or multimedia messages), and data communications, which may be limited to a particular device or shared across multiple devices. Data services and other services may further be subject to limits on communication speed or other performance metrics, upload/download volume, ability to tether a device, etc.

Because of the variety of products and services available from mobile wireless network operators, customers can find the process of comparing, selecting, and purchasing mobile device(s) and associated subscription plan(s) to be confusing and complicated. Such confusion can arise as customers shop for devices, subscription or prepaid plains, or services in retail stores. For example, when entering a retail store, customers must often do work to gain a meaningful comparison between their current products and services and the products and services that are offered by the retailer. This work involves the customers identifying their current products and/or service plans, and identifying the features of the products or service plans that the customers have access to and make use of, or that the customers need or desire but do not currently have access to. Then, the customers must compare the information regarding what they have, what they need or desire, and what a retailer is offering in order to identify the product/device/service to purchase.

Retailers have tried to improve the product/service selection process by integrating information on a customer's previous interactions with a retail store, general consumer data, and information on the customer's account information or contract details to help the customer make decisions and select a product or service. However, customers do not have access to this information when in a retail store. Also, in-store service representatives generally do not have access to the information, and as a result only have a limited view on a customer's usage or needs. Furthermore, even in situations in which in-store representatives can retrieve customers' account information from a computer terminal, the lookup process takes time and is therefore often avoided by customers who find it to be an inconvenience. Furthermore, the information is generally only retrieved by a customer service representative after the customer has made a purchase decision and has queued in line to pay for the purchase, i.e. at a time that is too late for the representative to provide in-depth help to the customer.

A need therefore exists for methods and systems of providing a personalized retail experience to a customer in a retail store, for example to assist the customer in comparing and selecting products and services for purchase. A need further exists for methods and systems of providing retail store representatives with customer information so as to better assist customers in the retail store.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
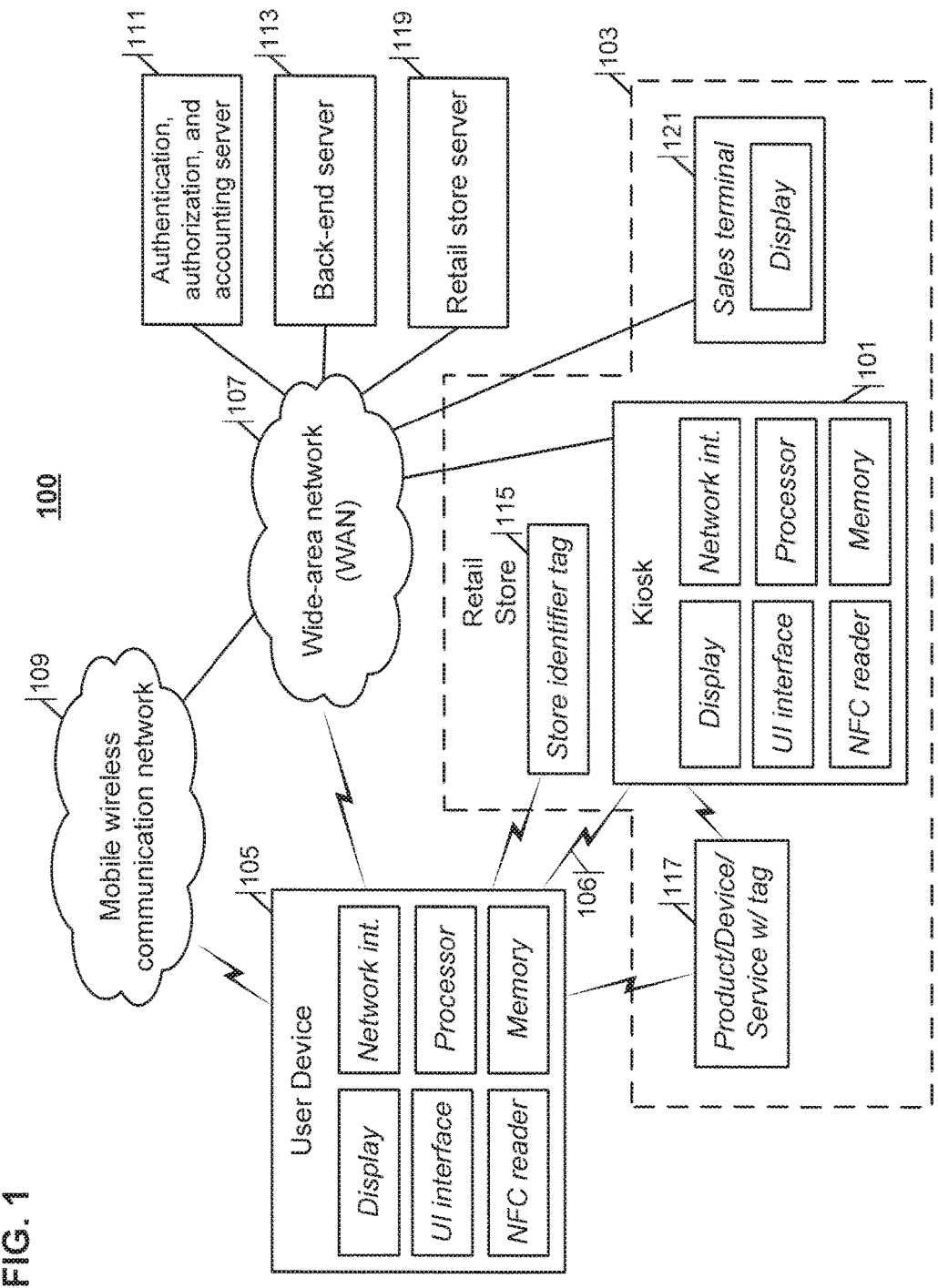
FIG. 1 is a schematic diagram illustratively showing elements of a system for providing an NFC-based retail experience using a retail kiosk and/or mobile device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to providing a near-field communication (NFC)-based retail experience to a customer using a retail kiosk or mobile device.

A retail kiosk is configured to provide product information and personalized offers to a customer in a retail store. The retail kiosk includes a display unit, a user-input interface, an NFC reader, and a network communication interface. The retail kiosk establishes an NFC-based communication link with an NFC-compatible user device that is placed in the vicinity of the NFC reader, such as a customer's NFC-enabled mobile phone or tablet. The retail kiosk receives customer identifying information from the user device over the NFC-based communication link. In general, the customer identifying information is received as encrypted information, and includes information for authenticating the customer with an authentication, authorization, and accounting (AAA) server of a mobile wireless network provider. Using the customer identifying information, the retail kiosk authenticates the customer with the AAA server and retrieves customer retail information from a back-end server of the mobile wireless network provider. The customer retail information can include information on the customer's mobile device(s), the customer's mobile wireless communication plan(s), and special offers available to the customer. Based on the retrieved customer retail information, the retail kiosk provides a personalized retail experience to the customer based on input received from the customer through the user-input interface and output provided to the customer through the display unit. In addition, the retail kiosk can provide the personalized retail experience to the customer based on input received through the NFC reader. The retail kiosk can detect an NFC tag of a product that the customer places in the vicinity of the NFC reader, and can customize the retail experience based on the detected NFC tag—for example to provide information on the product associated with the NFC tag. The retail kiosk may additionally cause the retrieved customer retail information, or other information relating to the customer's personalized retail experience session, to be sent to a retail store server to provide retail staff with information on the customer's session, to enable a rapid checkout of the customer, or the like.

Additionally or alternatively, the customer's personalized retail experience may be provided on the customer's mobile device. The mobile device includes a display unit, a user-input interface, an NFC reader, and a mobile wireless communication interface. The mobile device establishes an NFC-based communication link with an NFC tag or reader that is placed in the vicinity of the mobile device's NFC reader, such as a NFC tag located in a retail store. The mobile device receives retail store identifying information from the user device over the NFC-based communication link. Using the store identifying information, the mobile device retrieves store retail information from a back-end server of the mobile wireless network provider. The store retail information can include information on retail services, products, and promotions available at the retail store. The mobile device may additionally obtain customer product information from the back-end server, including information on the customer's mobile device(s), the customer's mobile wireless communication plan(s), and special offers available to the customer. Based on the retrieved store retail information and customer retail information, the mobile device provides a personalized retail experience to the customer based on input received from the customer through the user-input interface and output provided to the customer through the display unit. In addition, the mobile device can provide the personalized retail experience to the customer based on input received through the NFC reader. The mobile device can detect an NFC tag of a product that the customer places in the vicinity of the NFC reader, and can customize the retail experience based on the detected NFC tag—for example to provide information on the product associated with the NFC tag. The mobile device may additionally cause the retrieved customer retail information, or other information relating to the customer's personalized retail experience session, to a retail store server to provide retail staff with information on the customer's session, to enable a rapid checkout of the customer, or the like.

Reference now is made in detail to the examples illustrated in the accompanying drawings and discussed below. FIG. 1 is a schematic diagram illustratively showing elements of a system 100 for providing an NFC-based retail experience using a retail kiosk and/or mobile device.

The system 100 of FIG. 1 includes one or more kiosk(s) 101 and user device(s) 105 that are configured to communicate with each other directly (e.g., through NFC-based communication link 106) or indirectly through one or more wired or wireless connections (e.g., through networks 107 and/or 109). In general, a user device 105 is a mobile communication device of a user or customer, such as a smartphone and other mobile telephone, a tablet, or the like. A kiosk 101 is a computer terminal designed for public use, such as a computer terminal located in a public space (e.g., a retail store 103, a shopping mall, or the like) and designed to provide information on products and services offered by one or more retailers. In one example, kiosk 101 is semi-permanently installed by a retailer in a retail store, shopping mall, or other specified location for use by customers seeking information on the retailers product and service offerings. The schematic diagram of FIG. 1 shows an example in which the kiosk 101 is a retail kiosk associated with or located in a retail store 103.

The kiosk 101 is equipped with a display and/or a speaker for providing information to customers, and a user-input (UI) interface for receiving information from customers through a keyboard, mouse, touch-pad, touch-screen, microphone, or the like. The kiosk 101 is further equipped with an NFC reader for communication with NFC-enabled devices and tags placed within the vicinity of the NFC reader. The NFC reader can receive or retrieve information from NFC-enabled devices and tags that are located within the communication range of the NFC reader, and can transmit or communicate information to NFC-enabled devices located in the communication range. A network communication interface enables the kiosk 101 to communicate across packet-based networks, such as wide-area network (WAN) 107. Operation of the kiosk 101 is controlled in part by a processor configured to execute instructions stored on a memory of the kiosk 101.

The user device 105 is generally a smartphone or other mobile telephone, a tablet, a mobile station, a portable handset, a personal digital assistant, or the like. The user device 105 is equipped with a display and/or a speaker for providing information to a user, and a user-input (UI) interface for receiving information from the user through a keypad, touch-screen, microphone, or the like. The user device 105 is further equipped with an NFC reader for communication with NFC-enabled devices and tags located within the vicinity of the NFC reader. A wireless network communication interface enables the user device 105 to communicate across wireless networks, such as mobile wireless communication network 109. The wireless network communication interface may additionally or alternatively be operative to communicate through other types of wireless communication networks and wide area networks, such Wi-Fi-based networks and/or WAN 107. Operation of the user device 105 is controlled in part by a processor configured to execute instructions stored on a memory of the user device 105. The processor serves as a programmable controller of the user device 105, in that it controls operations of the device 105 in accord with programming that it executes.

In addition to providing a communication connection between user device(s) 105 and kiosk(s) 101, the WAN 107 connects the user device(s) 105 and kiosk(s) 101 to network servers providing support for the NFC-based retail experience. The WAN 107 can be implemented by a number of interconnected networks, and can include one or more Wi-Fi or radio access networks (RANs).

An authentication, authorization, and accounting (AAA) server 111 provides authentication functionality for confirming the identity of user devices 105 through WAN 107. The AAA server 111 is generally associated with a particular mobile wireless communication network operator, such as an operator of mobile wireless communication network 109, and provides the authentication functionality for user devices 105 that are subscribed to or otherwise associated with the operator. In some examples, the AAA server 111 provides authentication functionality for user devices 105 that are not necessarily subscribed with an operator of the server.

A back-end server 113 provides back-end services through WAN 107, including services to provide user/customer information, retail store information, application programs, or the like to user device(s) 105 and kiosk(s) 101. The back-end server 113 may be associated with the operator of a mobile wireless communication network associated with one or more of the user device 105, the retail store 103 or retailer, and the kiosk 101, and provide information and services in support of the operator's and/or retailer's operations.

Mobile wireless communication network 109 provides mobile wireless communications services to user device 105, as well as to other mobile communication devices (not shown) via a plurality of base stations. The mobile wireless communication network 109 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile wireless communication network 109 may provide voice call, messaging, and/or data communication services.

In the illustrative example of FIG. 1, the kiosk(s) 101 of system 100 are associated with and/or located in a retail store 103, and may be used to provide a customer with information about products and services sold by the retail store 103 or the store's associated retailer. The retail store 103 can include one or more store identifier tag(s) 115, such as NFC-enabled tags or readers, that are configured to provide identifying information for the retail store 103 through an NFC communication link. In some examples, the store identifier tag(s) 115 can provide additional information through the NFC communication link, including information on products and services offered by the retail store 103 or retailer. The retail store 103 sells products, devices, and/or services, and may include tags 117 associated with different products/devices/services. Each tag 117, which may be an NFC-enabled tag or reader, is associated with a particular product, device, or service offered by the retail store 103 and provides an identifier for the particular product, device, or service to a device reading the tag. The tag may be attached to a sample product/device/service or to a dummy product/device/service, attached to product/device/service packaging, attached to a shelf or display featuring the product/device/service, or the like.

A retail store server 119 connected to WAN 107 provides retail store sales representatives and other staff with information on customers in the retail store 103. The retail store server 119 may receive information relating to customers using kiosk 101 located in or associated with the retail store 103, and/or customers using user devices 105 having scanned the store identifier tag 115. The retail store 119 provides the received information to sales representatives through one or more sales terminal(s) 121 of the retail store, such as computers or tablets used by sales representatives to obtain product information and to process purchase and check-out transactions in the store 103.

Figure 2:
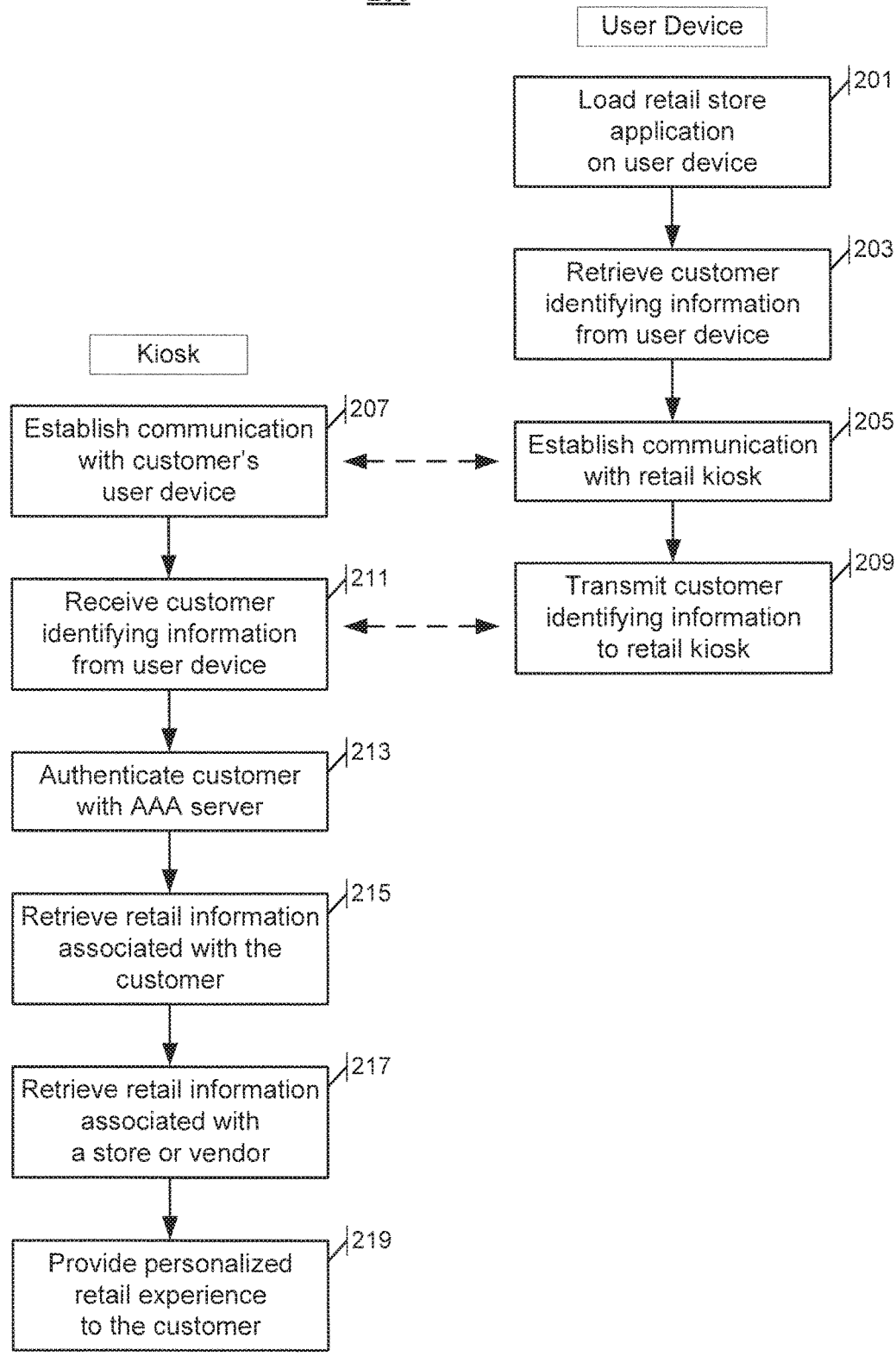
FIG. 2 illustrates a method for providing NFC-based retail experiences on a retail kiosk.
Figure 3:
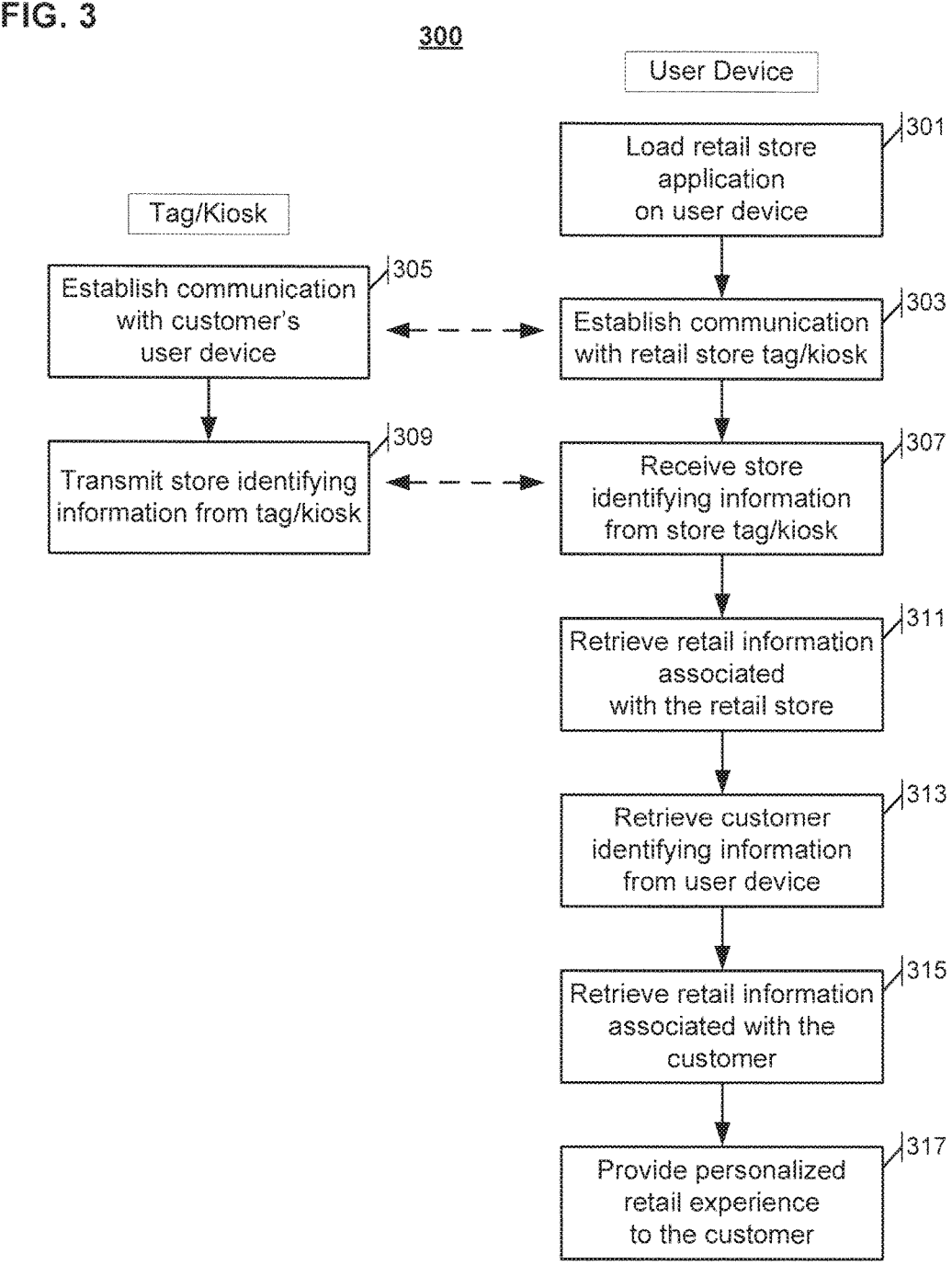
FIG. 3 illustrates a method for providing NFC-based retail experiences on a user device.
Figure 4:
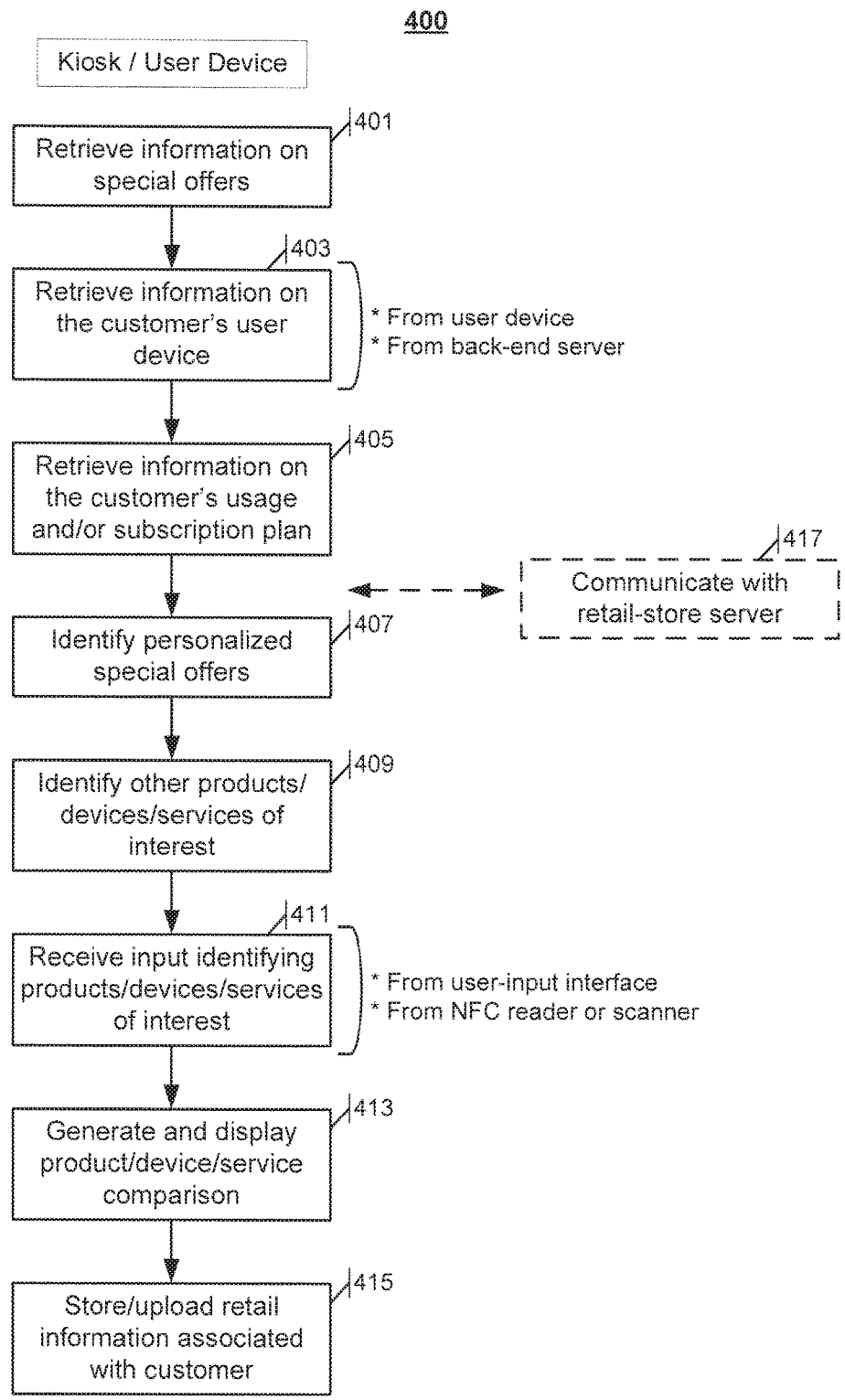
FIG. 4 illustrates a method of providing the personalized retail experience as part of providing NFC-based retail experiences using a retail kiosk.

FIGS. 2-4 are flow diagrams illustrating methods 200, 300, and 400 for providing NFC-based retail experiences using a retail kiosk 101 and/or a mobile device 105. FIG. 2 illustrates a method 200 in which a retail kiosk 101 provides a personalized retail experience; FIG. 3 illustrates a method 300 in which a user device 105 provides the personalized retail experience; and FIG. 4 illustrates a method 400 of providing the personalized retail experience.

In the method 200 of FIG. 2, a retail store application is loaded on a user device 105 in step 201. The retail store application may be downloaded, through network(s) 107 and/or 109 to the user device 105 from a server associated with the retail store such as back-end server 113. The retail store application is stored in a memory of the user device 105, and installed on the user device 105 for execution by a processor the user device 105. Once installed, the application is loaded or executed on the user device 105. As part of its execution, the application may provide a user of the device 105 with functionality for browsing through products, devices, and/or services available for purchase through a virtual retail store and/or a physical retail store 103, for comparing products/devices/services, and for ordering or purchasing products/devices/services.

In addition, when loaded on an NFC-enabled user device 105, the retail store application is configured to retrieve customer identifying information from the user device in step 203. The customer identifying information generally includes identifiers that can be used to uniquely identify a user associated with the user device 105 and to authenticate the user of the device 105. In one example, the customer identifying information can thus include an integrated circuit card identifier (ICC-ID), an international mobile subscriber identifier (IMSI), or an other identifier retrieved from the user device 105 or from a subscriber identity module (SIM) loaded into the user device 105. In another example, the customer identifying information can include a username/password pair of the user, such as a username/password pair used to access an account (e.g., an online account associated with a retailer or network operator) of the user. The customer identifying information can optionally include additional information, such as information retrieved from an operation system (O/S) of the user device 105 and identifying a device make and model, an O/S version running on the user device 105, features of the user device (e.g., storage and communication capabilities of the user device), or the like. The retail store application may generate and display a prompt on the display asking for permission from the customer to access or retrieve the customer identifying information from the memory, or asking the customer to enter the customer identifying information (e.g., username and password) through the UI interface. Once the retail store application obtains the customer identifying information, processing proceeds to step 205.

In step 205, the user device 105 is placed or swiped within the vicinity of a kiosk 101, such as within a communication range of an NFC reader of the kiosk 101. The NFC reader of the kiosk 101 detects that an NFC-enabled device 105 has been placed or swiped within its vicinity, and establishes an NFC-based communication link between the kiosk 101 and the user device 105 in step 207. The user device 105 transmits the customer identifying information to the retail kiosk across the established link in step 209. In turn, the kiosk 101 receives the customer identifying information from the user device 105 in step 211. In some examples, the customer identifying information communicated between the kiosk 101 and user device 105 is encrypted information. In other examples, only the information used to authenticate the user of the device 105 is encrypted, while optional information (e.g., information relating to an O/S, a device make or model, or the like) is not encrypted. In some examples, the user device 105 includes a passive NFC tag rather than an NFC reader. In such examples, the NFC tag of the user device 105 stores the customer identifying information, and makes the customer identifying information available for retrieval by the kiosk 101 across the established NFC-based communication link. Upon placing the user device 105 within the vicinity of the kiosk 101, the kiosk 101 retrieves the customer identifying information from the passive NFC tag of the user device 105 across the established link.

Using the customer identifying information, the kiosk 101 identifies the user/customer using the kiosk 101 as the customer associated with the user device 105. The kiosk 101 authenticates the customer in step 213 using the customer identifying information by sending an authentication request including the customer identifying information to the AAA server 111 across WAN 107. In general, the user device 105, kiosk 101, and AAA server 111 are associated with a same mobile wireless communication network provider/operator, and the AAA server 111 provides the kiosk 101 with an authentication result. If the authentication is not successful, the kiosk notifies the customer of the unsuccessful authentication and prompts the customer for alternative login credentials.

When the authentication is successful, or when the customer enters alternative login credentials that are successfully authenticated by the kiosk 101, the kiosk 101 proceeds to step 215. In step 215, the kiosk 101 retrieves retail information associated with the authenticated customer from the back-end server 113. The retail information can include information on the customer's products and devices (e.g., user devices associated with the customer's account) and the customer's services (e.g., subscription plan(s) or prepaid plan(s) associated with the customer's account). The retail information can further include information on a customer's usage of services (e.g., data regarding the types and amounts of services used by the customer, including voice call services, text messaging services, data services, tethering services, location services, or the like). The retail information can additionally include information regarding products, devices, and services for which the customer has previously demonstrated an interest, such as products/devices/services which the customer has previous viewed using a kiosk 101 or the retail store application. In some examples, the retail information further includes current offers available to the customer, such as any discounts or special offers on products/devices/services that may be of interest to the customer. The particular set of retail information that is retrieved by a kiosk 101 is determined by settings of the kiosk 101. For example, the kiosk 101 may be set to only retrieve certain types of retail information relating to the customer, so as to limit the quantity of information transferred to the kiosk 101. Alternatively, the kiosk 101 may only be authorized to retrieve certain types of retail information relating to the customer, so as to protect the customer's privacy.

In one example, the customer can select what retail information associated with the customer is stored in the back-end server 113, and/or what retail information associated with the customer can be retrieved by kiosk 101 in step 215. The selection can be performed by the customer using the retail store application on the user device 105 at any time prior to step 209. For example, the user can set certain privacy settings within the retail store application in order to ensure that usage data is not shared with the kiosk, in order to ensure that information on the user's other devices is not shared with the kiosk, or the like. In another example, the selection can be performed by the customer using the kiosk prior to step 215. In such a situation, the kiosk may prompt the user to select the type(s) of retail information that the user authorizes to be shared with the kiosk 101, and/or to select the type(s) of retail information that the user does not authorize to be shared with the kiosk 101. In step 215, the kiosk then proceeds to retrieve only the type(s) of retail information associated with the customer that the customer has authorized to be shared with the kiosk 101.

In step 217, the kiosk 101 retrieves retail information associated with the retail store 103 and/or a retailer/vendor. The information can be retrieved from a memory of the kiosk 101, from the back-end server 113, and/or from appropriate source(s). The retail information can include information on the products/devices/services available for purchase in the retail store 103 or from the retailer/vendor, products/devices that are in stock in the retail store 103, current special offers or discounts that are available to customers of the retail store 103 or retailer/vendor, or the like. The retail information can include information on the capabilities, features, technical specification, and prices of products/devices/services.

In step 219, the kiosk 101 provides a personalized retail experience to the customer. The retail experience is tailored to the customer identified based on the customer identifying information received from the user device 105 through the NFC communication link in step 211. The retail experience is also tailored based on the retail information associated with the customer retrieved in step 215, and based on the retail information associated with the retail store or vendor retrieved in step 217. The retail experience can be personalized by enabling the customer to view information on the customer's own products/devices/services, to receive recommendations of products/devices/services that may be of interest to the customer based on the customer's usage, to select products/devices/services for comparison to the customer's own products/devices/services and/or to the customer's usage patterns, to retrieve information on products/devices/services that the customer previously showed an interest in, or the like. Further details regarding the personalized retail experience are described in relation to FIG. 4 and method 400 below.

While steps 207 and 211 of method 200 are shown and described as involving NFC-based communication between a kiosk 101 and a user device 105, the steps can more generally involve communication between a kiosk 101 and an NFC-enabled tag. In examples in which the NFC-enabled tag is used, the tag is associated with a particular customer. The tag stores customer identifying information, and the information can be retrieved from the tag by the kiosk 101 in step 211. The customer identifying information retrieved from the tag can then be used by the kiosk 101 when performing steps 213-219. Additionally, while steps 207 and 211 are described as involving NFC-based communication, the steps can additionally involve communications between a kiosk 101 and a user device 105 that are routed in part through network(s) 107 and/or 109. For example, while identifiers may be communicated through the NFC-based communication link, additional information regarding the user device 105 may be communicated to the kiosk 101 through networks 107 and/or 109.

FIG. 3 illustrates a method 300 in which a user device 105 provides the personalized retail experience. In the method 300 of FIG. 3, a retail store application is loaded and executed on a user device 105 in step 301. Step 301 is substantially similar to step 201 of method 200, and reference can be made in relation to step 301 to the description of step 201 above.

In step 303, the user device 105 is placed or swiped within the vicinity of a kiosk 101 or store identifier tag 115, such that the kiosk 101 or NFC-enabled tag 115 is within a communication range of the NFC reader of the user device 105. The NFC reader of the user device 105 detects that an NFC-enabled kiosk 101 or tag 115 has been placed within its vicinity, and establishes an NFC-based communication link between the user device 105 and the kiosk 101 or tag 115 in step 305. Using the communication link, the user device 105 receives store identifying information from the kiosk 101 in step 307, or retrieves store identifying information from the tag 115. The store identifying information is transmitted by the kiosk 101 over the established communication link in step 309, or is stored by the tag 115 and made available for retrieval by the user device 105 over the established communication link. The store identifying information includes an identifier for the retail store 103 and/or a retailer, the identifier uniquely identifying the retail store 103 and/or retailer. The store identifying information can optionally include a unique identifier for the kiosk 101 or tag 115. The store identifying information can optionally include additional information relating to the retail store 103 and/or retailer, such as a store name, address or location information, or the like. In some examples, the store identifying information is communicated as encrypted information between the tag 115 or kiosk 101 and the user device 105.

In response to obtaining the store identifying information, the retail store application running on the user device 105 determines that the user of the device 105 requests a personalized retail experience based on the retail store 103 or vendor identified by the information. Hence, in step 311, the user device 105 retrieves retail information associated with the retail store 103 identified by the received store identifying information. The retail information is generally retrieved from the back-end server 113 across the mobile wireless communication network 109 and the WAN 107, or across a Wi-Fi network connection and the WAN 107. The retail information associated with the retail store is described in relation to step 217 above, and reference can be made to the description of step 217 for further detail.

In addition, the user device 105 retrieves customer identifying information in step 313, and retrieves retail information associated with the customer in step 315. The customer identifying information is described in relation to step 203 above, and reference can be made to the description of step 203 for further detail. The retail information associated with the customer may be retrieved, in part, from a memory of the user device 105. For example, information relating to the user's device 105 (e.g., identification of a make and model of the device) and usage of the device 105 (e.g., a number of voice minutes, text messages, or data transfer used since the beginning of a current billing cycle, or over the course of previous billing cycles) can be retrieved at least in part from the memory of the user device 105 itself. Additionally, information gathered during prior usage of the retail store application, such as information regarding products and services identified by the customer as being of interest using the retail store application can be retrieved from the memory of the user device 105. The retail information associated with the customer is additionally retrieved from the back-end server 113 through the network(s) 107 and 109 and/or a Wi-Fi network connection. The retail information associated with the customer is described in relation to step 215 above, and reference can be made to the description of step 215 for further detail.

In step 317, the user device 105 provides a personalized retail experience to the customer. The retail experience is tailored to the customer identified based on the store identifying information received from the kiosk 101 or tag 115 through the NFC communication link in step 307. The retail experience is tailored based on the retail information associated with the customer and with the retail store, as retrieved in steps 311 and 315. The retail experience can be personalized by enabling the customer to view information on the customer's own products/devices/services, to receive recommendations of products/devices/services that may be of interest to the customer based on the customer's usage, to select products/devices/services for comparison to the customer's own products/devices/services and/or to the customer's usage patterns, to retrieve information on products/devices/services that the customer previously showed an interest in, or the like. Further details regarding the personalized retail experience are described in relation to FIG. 4 and method 400 below.

FIG. 4 illustrates a method 400 of providing the personalized retail experience in further detail. The method relies on a variety of customer information in order to tailor a retail experience to a particular customer's needs and/or wants. The method can, in general, be implemented on a kiosk 101 (e.g., in step 219 of method 200) or on a user device 105 (e.g., in step 317 of method 300).

The method begins at step 401 with the retrieval of information on special offers. The information on special offers can be retrieved from a local memory of the device providing the retail experience (e.g., kiosk 101 or user device 105), or from a back-end server 113. The information on special offers can include offers that are offered only to selected customers, such as offers identified in the retail information associated with the customer, and/or offers that are offered only to customers of selected retail stores, such as offers identified in the retail information associated with the retail store 103 or vendor. The information on special offers can also include offers that are offered to other groups of customers and/or to the general public.

In step 403, information on a customer's user device 105 is retrieved. The information can identify the device make and model, and an 0/S version running on the device 105. The information can further identify device features, such as the total memory available on the device and/or any associated removable storage media, the types of communications protocols that the device can use (e.g., whether the device is Wi-Fi, 3G, and/or 4G enabled), any peripheral devices that the device can be used with and/or is commonly used with (e.g., whether a user commonly uses a wired or wireless headset, a stylus, external speakers, or the like with the user device), or the like. The information on the user device can be obtained directly from a memory of the user device 105 (e.g., in situations in which the retail experience is provided on the user device 105), or indirectly from the memory of the user device 105 through an NFC communication link or a network connection (e.g., in situations in which the retail experience is provided on a kiosk 101 and the information is received by the kiosk 101 from the user device 105). The information can alternatively be retrieved through the WAN 107 from the back-end server 113.

In step 405, information on the customer's usage and/or on the customer's subscription plan (including any prepaid service plan) is retrieved. The usage information can be retrieved from the user device 105, for example in situations in which the user device 105 tracks usage information for the user. More commonly, however, the usage information is retrieved from a server of a provider of mobile wireless communication services to the user device 105, such as from the back-end server 113. The subscription plan information is similarly retrieved from a server of the provider of mobile wireless communication services such as from the back-end server 113.

Based on the information on special offers and on retrieved customer information (e.g., information on the customer's user device, and on the customer's usage and subscription plan), personalized special offers are identified and provided to the customer in step 407. The personalized special offers include a selection among the special offers retrieved in step 401. In particular, the personalized special offers include offers that are identified as being of particular relevance to the customer based on the customer information retrieved in steps 403 and 405. For example, the personalized special offers can include offers on subscription plans that are better adapted to the customer's usage than the customer's current subscription plan, on devices that are better adapted to the customer's usage and/or the customer's frequently used peripheral devices than the customer's current device, or the like.

Based on the customer information, products/devices/services of interest are identified and provided to the customer in step 409. The products/devices/services of interest can include recommended products/devices/services that are identified as being of particular relevance to the customer based on the customer information retrieved in steps 403 and 405. In one example, the products/devices/services can include a device having a capability (e.g., a powerful, high quality speaker) that would obviate the customer's need for a particular frequently used peripheral device (e.g., external speakers). In another example, the identified products/devices/services can include a subscription plan offering more data volume or faster download speeds than a customer's current subscription plan, the plan having been selected identified upon determining that the customer frequently exceeds a data volume limit or download speed of the customer's current subscription plan.

In addition to providing special offers and product/device/service recommendations, the customer can select or otherwise identify products/devices/services for which the customer would like additional information. As such, in step 411, input identifying products/devices/services is received from the user. The input can be received through the user-input interface of the kiosk 101 or of the user device 105, for example by receiving a user selection of a product/device/service shown on a display. The input can additionally be received through the NFC reader of the kiosk 101 or user device 105. For example, the customer identifies a product/device/service of interest in the retail store, and locates a tag 117 associated with the product/device/service. The user places the tag 117 within the vicinity of the NFC reader of the kiosk 101 or mobile device 105 in order to cause the kiosk 101 or mobile device 105 to establish a communication link with the tag 117 and retrieve a product identification code from the tag 117. In turn, the kiosk 101 or mobile device 105 retrieves information about the product from memory, from the tag 117, and/or from the back-end server 113 based on the product identification code obtained from the tag 117, and provides the production information to the customer on the display of the kiosk 101 or mobile device 105.

In one kiosk-based example, a kiosk may have a hand-held scanner with which the user can circulate through the store to scan tags 117 of items of interest throughout the store. The scanner can then be synchronized with the kiosk 101 through a wired or wireless connection to provide the product identification codes of scanned products from the scanner to the kiosk 101. In another kiosk-based example, a user device 105 can be used to scan NFC-enabled tags 117 throughout the store 103. The user device 105 can then be synchronized with the kiosk 101 through an NFC communication link, a Wi-Fi connection, or through the network(s) 107/109, to provide the product identification codes of scanned products from the user device 105 to the kiosk 101. In a user-device-based example, the user device is used to scan NFC-enabled tags 117 throughout the store, and the user device 105 retrieves product information for the scanned products from the back-end server 113 for display to the customer on the user device's display.

The information for products/devices/services identified (e.g., scanned) by the customer as being of interest can be provided on the display for use by the customer. Additionally, the information can be provided in a comparison format in step 413, such that the customer can readily identify similarities and differences between competing products/devices/services that the customer has selected for comparison. The comparison format can further highlight compatibilities between different types of products/devices/services, for example by identifying compatibilities between a selected mobile device and a selected head-set so that the customer can determine whether the products/devices/services are operable together. Thus, the information about a particular product/device/service that is displayed to the user, and/or the information about the product/device/service that is retrieved from the back-end server 113, may change depending on the situation. For example, if a product/device/service is being compared to a product/device/service of a similar type, information regarding the features, performance, and capabilities of the two items (e.g., two different smart-phones, or two different head-sets) may be retrieved and displayed. However, if a product/device/service is being compared to a product/device/service of a substantially different type (e.g., a smart-phone and a head-set), information relating to the compatibility of the two products may be retrieved and displayed.

In step 415, information related to the input received from the customer in step 411 can be stored in a memory of the kiosk 101 and/or of the user device 105, and/or uploaded for storage on the back-end server 113. The kiosk 101, user device 105, and/or back-end server 113 may thus store a "history" of the customer's retail experiences. The information can be stored as part of retail information associated with the customer, and used to identify products/devices/services of interest to the customer when the customer accesses the retail store application and/or a kiosk 101 at a future time. The information uploaded and stored on the back-end server 113 can be used in a future personalized shopping session that the customer may initiate, even if the future session is initiated on a different device than a current session (e.g., on a different kiosk 101 and/or user device 105, in a different retail store 103, or the like).

As part of providing the personalized retail experience to the customer, the kiosk 101 or user device 105 on which the experience is provided can cause information to be communicated to a retail-store server 119 in step 417. In turn, the retail-store server 119 can provide the information to one or more sales terminal(s) 121 used by in-store service representatives to enable the representatives to better serve customers. In one example, the kiosk 101 can provide identifying information about the customer to the retail-store server 119, for example upon receiving the information from the user device 105 (e.g., in any one of steps 211, 403, or 405, when a user "checks-in" to the retail store 103). In another example, the user device 105 can provide identifying information about the customer to the retail-store server 119 upon receiving the store identifying information from a store tag 115 (e.g., in step 307). The identifying information can be used by the retail-store server 119 to provide sales terminal(s) 121 used by representatives with profile information relating to customers currently shopping in the store 103. The kiosk 101 and user device 105 can provide to the retail-store server 119 and sales terminal(s) 121 information relating to the products/devices/services of interest to the customer (e.g., products identified/selected by the customer in step 411), to enable representatives to provide additional information about the products/devices/services to the customer. The kiosk 101 and user device 105 can further provide information on the customer's current user device, current subscription plan, usage, and the like, to enable representatives to better advise the customers. If a customer needs assistance while using the kiosk 101 or user device 105, the customer can requests assistance through the kiosk 101 or retail store application. The request is sent to the retail store server 119, which forwards the request including information identifying the kiosk 101 (and location of the kiosk) or user terminal 105 used by the customer to a sales terminal 121 to enable a sales representative to assist the customer. Finally, if the customer indicates a desire to purchase a product/device/service through the kiosk 101 or through the retail store application on the user device 105, information to enable an expedited purchase and check-out process for the customer can be provided to the retail-store server 119 and sales terminal(s) 121.

The personalized retail experience provided by method 400 can be provided on a kiosk 101 and based on a customer's input to and interactions with the kiosk 101, on a user device 105 and based on the customer's input to and interactions with the user device 105, or simultaneously on a kiosk 101 and a user device 105. For example, the experience can be simultaneously provided on a kiosk 101 from which a user device 105 received store identifying information (e.g., in step 307) and to which the user device 105 provided customer identifying information (e.g., in step 209). In such an example, the customer can use the user device 105 to scan NFC-enabled tags 117 of products/devices/services throughout the store 103. The user device 105 is then synchronized with the kiosk 101 through an NFC communication link (e.g., by tapping the user device 105 to the kiosk 101 when the customer has finished selecting products), or through a Wi-Fi connection or network(s) 107/109 (e.g., in real time as the customer is selecting products), to provide the product identification codes of scanned products from the user device 105 to the kiosk 101. Information about the scanned products can then be provided to the user on one or both of the user device 105 and kiosk 101. Additionally, different information can be selected on each of the user device 105 and kiosk 101. For instance, the user device 105 can provide information on a single product at a time (e.g., the last scanned product, or the last product for which the user requested product information), while the kiosk 101 can provide product comparison information (e.g., regarding all of, or a selection of, the scanned products). The information provided on the user device 105 and kiosk 101 may be different but nonetheless overlapping.

Additionally, information relating to a customer's interaction with a kiosk 101 can be provided to a user device 105 to enable a customer to access the information at a later time (e.g., after the customer has left the retail store 103, or after the customer has finished using the kiosk 101). For example, the kiosk 101 may upload to the back-end server 113 information relating to products that were identified as products of interest to the customer based on the customer's interactions with the kiosk 101. In turn, the retail store application running on the user device 105 may retrieve from the back-end server 113 the information relating to products identified as being of interest to the customer, to enable the customer to consult the information at a later time on the user device 105. In one example, at the time the information is uploaded, the kiosk 101 may identify to the back-end server 113 the user device 105 from which customer identifying information was received (in step 211). The back-end server 113 may then, once the upload of the information is complete, send a notification to the retail store application running on the user device 105 to notify the application that information has been uploaded to the server and is available for retrieval by the application.

In examples in which the customer uses a user device 105 to scan NFC-enabled tags 117 of products/devices/services throughout the store 103, the user may be presented with a display screen showing a list of all scanned products/devices/services (e.g., on the display of the user device 105, or on a display of a kiosk 101). The customer can then select one or more of the scanned products/devices/services to obtain additional information about the selected items, generate a comparison of the selected items, and/or eliminate certain items from the list. The list of scanned products/devices/services can additionally include items that the user identified as being of interest in previous interaction(s) and/or session(s) with the retail store application or with the same kiosk or a different kiosk. The kiosk 101 and user device 105 may communicate, either directly through an NFC communication link or indirectly through a Wi-Fi or other network connection, such that any change to the list performed by the customer on one device is reflected on the list shown on the other device.

While FIG. 4 shows steps 407-415 as being conducted in a linear fashion, the steps can be repeated and/or performed in various combinations based on user input. For example, based on input received from the customer in step 411, additional offers and products/devices/services of interest can be identified in steps 407 and 409 and information on the additional offers and products/devices/services can be displayed and compared in step 413. In one use example, in response to a customer scanning a product via NFC, the kiosk 101 receives a product identifier, and retrieves product information from a product database stored in the kiosk 101 or on the back-end server 113. The kiosk 101 may also add the product to the customer's store history, and may identify a new promotion or special offer for the customer. The kiosk 101 may further display information for the scanned product, personalized promotions, and comparisons to existing products the customer has purchased or selected for comparison.

As shown by the above discussion, functions relating to providing a near-field communication (NFC)-based retail experience to a customer using a retail kiosk 101 or mobile device 105 may be implemented on computers connected for data communication as shown in FIG. 1.

A general-purpose computer or a user device typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for storing retail information and customer information. The software code is executable by the general-purpose computer that functions as the kiosk 101 or any of the servers 111-119, and/or by the user device 105. In operation, the code is stored within the computer platform. At other times, however, the software may be stored at other locations and/or transported for loading into the appropriate computer system. Execution of such code by a processor of the computer platform or user device 105 enables the platform or device to implement the methodology for providing the personalized retail experience, in essentially the manner performed in the implementations discussed and illustrated herein.

Figures 5, 6:
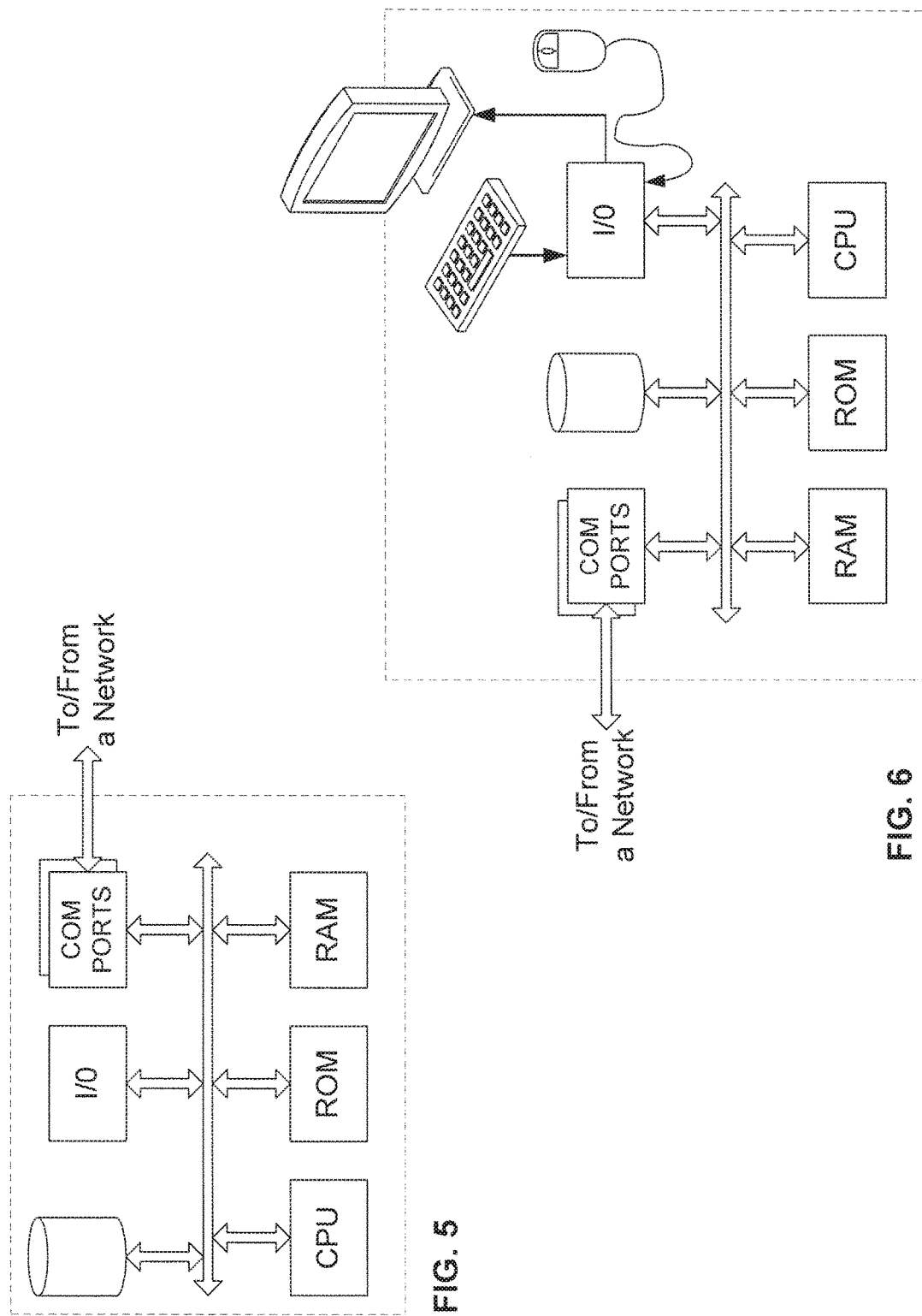
FIG. 5 is a simplified functional block diagram of a computer that may be configured as a host or server, for example, to function as the back-end server in the system of FIG. 1.
FIG. 6 is a simplified functional block diagram of a personal computer or other user device or terminal device.

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a kiosk, personal computer, or other type of work station or terminal device, although the computer of FIG. 6 may also act as a server if appropriately programmed.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of providing a personalized retail experience outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:
1. A retail kiosk comprising:
a display unit;
a user-input interface;
a near field communication (NFC) reader;
a network communication interface for communicating across a network;
a processor; and
a memory storing instructions which, when executed by the processor, cause the retail kiosk to provide an NFC-based retail experience to a customer by performing functions to:

establish an NFC-based communication link with an NFC-compatible user device that is placed in the vicinity of the NFC reader;

receive customer identifying information from the user device over the NFC-based communication link, authenticate the customer with an authentication server of a mobile wireless network provider;

upon successfully authenticating the customer, retrieve retail information associated with the customer from a back-end server of the mobile wireless network provider using the network communication interface; and provide a personalized retail experience to the customer based on the retrieved retail information associated with the customer, wherein the function to provide the personalized retail experience to the customer includes functions to:

retrieve information related to a first product or service associated with a first NFC tag detected by an NFC reader of the user device;

receive, at the retail kiosk from the user device via a wireless network communication interface of the user device, information regarding compatibility of the first product or service with a second product or service ; and display, on the retail kiosk, the information regarding the compatibility of the first product or service with the second product or service.

2. The retail kiosk of claim 1, wherein the kiosk is located within or is associated with a retail store, and wherein the instructions further cause the retail kiosk to perform functions to:

cause a communication to be sent from the retail kiosk using the network communication interface to a retail store server of the retail store, wherein the communication includes at least one of information identifying the customer and the retrieved retail information associated with the customer.

3. The retail kiosk of claim 1, wherein the function to provide the personalized retail experience further comprises a function to cause information to be provided from the retail kiosk to the customer's NFC-compatible user device for display on the user device.

4. The retail kiosk of claim 1, wherein the retail information associated with the customer includes information on at least one of (i) one or more devices of the customer, (ii) one or more service subscriptions of the customer, and (iii) one or more retail offers available to the customer.

5. The retail kiosk of claim 4, wherein the function to provide the personalized retail experience further comprises functions to:

retrieve information regarding frequency of use of a peripheral device used by the customer;

identify, based on the retrieved retail information associated with the customer and the information regarding the frequency of use of the peripheral device used by the customer, a recommended device or service that is determined to be of relevance to the customer, and display information regarding the recommended device or service.

6. The retail kiosk of claim 4, wherein the function to provide the personalized retail experience further comprises functions to:

receive selection of a device or service from the customer;

retrieve product information related to the selected device or service, including information on attributes or specifications of the selected device or service; and generate and display a comparison between the attributes or specifications of the selected device or service and the one or more devices or service subscriptions of the customer.

7. The retail kiosk of claim 4, wherein the function to provide the personalized retail experience further comprises functions to: identify, based on the retrieved retail information associated with the customer, a recommended device or plan that is determined to be of relevance to the customer; and generate and display a comparison between the recommended device or plan and the one or more mobile devices or mobile wireless service subscription plans of the customer.

8. The retail kiosk of claim 5, wherein the function to provide the personalized retail experience further comprises a function to: generate and display a comparison between the recommended device or service and the one or more devices or service subscriptions of the customer.

9. The retail kiosk of claim 5, wherein the recommended device or service is a first recommended device or service, and the function to provide the personalized retail experience further comprises functions to:

identify, based on the retrieved retail information associated with the customer, a second recommended device or service that is determined to be of relevance to the customer; and generate and display a comparison between the second recommended device or service and (a) the one or more devices or service subscriptions of the customer, (b) the first recommended device or service , or (a) and (b).

10. The retail kiosk of claim 1, wherein the NFC reader is a hand-held scanner that is configured to be removed by the customer and is transportable by the customer throughout a retail store to scan NFC tags associated with items of interest throughout the store.

11. A method comprising:

establishing a near field communication (NFC)-based communication link between a retail kiosk and a customer's NFC-compatible user device that is placed in the vicinity of an NFC reader of the retail kiosk;

receiving customer identifying information from the user device over the NFC-based communication link;

authenticating the customer with an authentication server of a mobile wireless network provider;

upon successfully authenticating the customer, retrieving retail information associated with the customer from a back-end server of the mobile wireless network provider using a network communication interface of the retail kiosk; and providing a personalized retail experience to the customer based on the retrieved retail information associated with the customer, wherein providing the personalized retail experience comprises:

retrieving information related to a first product or service associated with a first NFC tag detected by an NFC reader of the user device;

receiving at the retail kiosk from the user device via a wireless network communication interface of the user device information regarding compatibility of the first product or service with a second product or service; and displaying, on the retail kiosk, the information regarding the compatibility of the first product or service with the second product or service.

12. The method of claim 11, further comprising:
establishing an NFC-based communication link with an identifier NFC tag that is placed in the vicinity of the NFC reader of the user device, the identifier NFC tag configured to communicate an identifier of a retail store; and
in response to receiving the identifier of the retail store from the identifier NFC tag over the NFC-based communication link, retrieving retail information associated with the retail store from the back-end server, wherein the retail kiosk is in or is associated with the retail store.

13. The method of claim 12, wherein the retail information associated with the retail store includes information on at least one of retail services, products, and promotions available at the retail store.

14. The method of claim 11, wherein the kiosk is located within or is associated with a retail store, and further comprising:
causing a communication to be sent from the retail kiosk using the network communication interface to a retail store server of the retail store, wherein the communication includes at least one of information identifying the customer and the retrieved retail information associated with the customer.

15. The method of claim 11, wherein the providing the personalized retail experience further comprises causing information to be provided from the retail kiosk to the customer's NFC-compatible user device for display on the user device.

16. The method of claim 11, wherein the retail information associated with the customer includes information on at least one of (i) one or more mobile devices of the customer, (ii) one or more mobile wireless service subscription plans of the customer, and (iii) one or more retail offers available to the customer.

17. The method of claim 16, wherein the providing the personalized retail experience further comprises:
receiving a selection of a device or plan from the customer;
retrieving product information related to the selected device or plan, including information on attributes or specifications of the selected device or plan; and
generating and displaying a comparison between the attributes or specifications of the selected device or plan and the one or more mobile devices or mobile wireless service subscription plans of the customer.

18. The method of claim 16, wherein the providing the personalized retail experience further comprises:
identifying, based on the retrieved retail information associated with the customer, a recommended device or plan that is determined to be of relevance to the customer; and
generating and displaying a comparison between the recommended device or plan and the one or more mobile devices or mobile wireless service subscription plans of the customer.

\* \* \* \* \*